(12) United States Patent
Zhang

(10) Patent No.: US 9,990,364 B2
(45) Date of Patent: *Jun. 5, 2018

(54) PROCESSING STRUCTURED DATA

(71) Applicant: Ximpleware, Inc., Milpitas, CA (US)

(72) Inventor: Zhengyu Zhang, Milpitas, CA (US)

(73) Assignee: Ximpleware, Inc., Milpitas, CA (US)

( * ) Notice: Subject to any disclaimer, the term of this patent is extended or adjusted under 35 U.S.C. 154(b) by 4 days.

This patent is subject to a terminal disclaimer.

(21) Appl. No.: 15/393,481

(22) Filed: Dec. 29, 2016

(65) Prior Publication Data

US 2017/0109359 A1    Apr. 20, 2017

Related U.S. Application Data

(63) Continuation of application No. 13/894,118, filed on May 14, 2013, now abandoned, which is a continuation of application No. 13/099,237, filed on May 2, 2011, now abandoned, which is a continuation of application No. 11/777,110, filed on Jul. 12, 2007, now abandoned, which is a continuation-in-part of application No. 11/581,211, filed on Oct. 13, 2006, now Pat. No. 7,761,459, which is a continuation-in-part of application No. 10/272,077, filed on Oct. 15, 2002, now Pat. No. 7,133,857.

(51) Int. Cl.
*G06F 17/30*  (2006.01)
*G06F 17/27*  (2006.01)

(52) U.S. Cl.
CPC .... *G06F 17/30076* (2013.01); *G06F 17/2705* (2013.01); *G06F 17/30914* (2013.01)

(58) Field of Classification Search
None
See application file for complete search history.

(56) References Cited

U.S. PATENT DOCUMENTS

| 5,748,953 | A | * | 5/1998 | Mizutani | G06F 17/30613 |
| 5,892,924 | A | * | 4/1999 | Lyon | H04L 12/4608 |
| | | | | | 370/405 |
| 6,209,124 | B1 | * | 3/2001 | Vermeire | G06F 8/70 |
| | | | | | 715/234 |
| 6,336,124 | B1 | * | 1/2002 | Alam | G06F 17/2229 |
| | | | | | 707/E17.006 |
| 6,418,446 | B1 | * | 7/2002 | Lection | G06F 17/30896 |

(Continued)

OTHER PUBLICATIONS

"U.S. Appl. No. 10/272,077, Amendment C filed Aug. 10, 2006 in response to Final Office Action dated Jul. 17, 2006", 13 pgs.

(Continued)

*Primary Examiner* — Bai D. Vu

(74) *Attorney, Agent, or Firm* — Schwegman Lundberg & Woessner, P.A.

(57) ABSTRACT

The present invention provides a fast and efficient way of processing structured data by utilizing an intermediate file to store the structural information. The structured data may be processed into a Binary mask Format (BMF) file which may serve as a starting point for post-processing. A tree structure built on top of the BMF file may be constructed very quickly, and also takes up less space than a DOM tree. Additionally, BMF records may reside entirely in the memory and contain structural information, allowing SAX-like sequential data access.

20 Claims, 6 Drawing Sheets

(56) References Cited

U.S. PATENT DOCUMENTS

| | | | | |
|---|---|---|---|---|
| 6,567,612 | B2* | 5/2003 | Yoshio | G09B 5/065 |
| | | | | 386/220 |
| 6,886,130 | B1* | 4/2005 | Unger | G06F 17/30899 |
| | | | | 707/E17.119 |
| 6,947,932 | B2* | 9/2005 | Brandin | G06F 8/427 |
| 7,006,099 | B2 | 2/2006 | Gut et al. | |
| 7,127,467 | B2* | 10/2006 | Yalamanchi | G06F 17/2241 |
| 7,133,857 | B1* | 11/2006 | Zhang | G06F 17/30914 |
| | | | | 707/917 |
| 7,178,100 | B2 | 2/2007 | Call | |
| 7,287,071 | B2 | 10/2007 | MacLean | |
| 7,321,900 | B1* | 1/2008 | Karun | G06F 17/30923 |
| 7,620,652 | B2 | 11/2009 | Zhang et al. | |
| 7,761,459 | B1 | 7/2010 | Zhang et al. | |
| 2002/0029229 | A1* | 3/2002 | Jakopac | G06F 17/30908 |
| | | | | 715/254 |
| 2002/0038319 | A1* | 3/2002 | Yahagi | G06F 17/2247 |
| | | | | 715/234 |
| 2002/0038363 | A1* | 3/2002 | MacLean | G06Q 10/087 |
| | | | | 709/224 |
| 2002/0087596 | A1* | 7/2002 | Lewontin | G06F 17/30896 |
| | | | | 715/234 |
| 2002/0103970 | A1* | 8/2002 | Gut | G06F 12/0802 |
| | | | | 711/118 |
| 2002/0143521 | A1* | 10/2002 | Call | G06F 17/2247 |
| | | | | 704/1 |
| 2003/0041304 | A1* | 2/2003 | Numata | G06F 17/2205 |
| | | | | 715/234 |
| 2013/0254219 | A1 | 9/2013 | Zhang | |
| 2017/0109359 | A1 | 4/2017 | Zhang | |

OTHER PUBLICATIONS

"U.S. Appl. No. 10/272,077, Examiner Interview Summary dated Mar. 28, 2006", 3 pgs.

"U.S. Appl. No. 10/272,077, Final Office Action dated Jul. 17, 2006", 9 pgs.

"U.S. Appl. No. 10/272,077, Final Office Action dated Aug. 12, 2005", 26 pgs.

"U.S. Appl. No. 10/272,077, Non Final Office Action dated Mar. 6, 2006", 21 pgs.

"U.S. Appl. No. 10/272,077, Non Final Office Action dated Mar. 16, 2005", 21 pgs.

"U.S. Appl. No. 10/272,077, Notice of Allowance dated Sep. 8, 2006", 7 pgs.

"U.S. Appl. No. 10/272,077, Pre-Appeal Brief Request filed Oct. 14, 2005", 3 pgs.

"U.S. Appl. No. 10/272,077, Response filed Apr. 17, 2006 to Non Final Office Action dated Mar. 6, 2006", 20 pgs.

"U.S. Appl. No. 10/272,077, Response filed Apr. 26, 2005 to Non Final Office Action dated Mar. 16, 2005", 23 pgs.

"U.S. Appl. No. 11/502,908, Amendment A filed May 14, 2009 in response to Non-Final Office Action dated Apr. 17, 2009", 19 pgs.

"U.S. Appl. No. 11/502,908, Interview Summary dated May 12, 2009", 2 pgs.

"U.S. Appl. No. 11/502,908, Non-Final Office Action dated Apr. 17, 2009", 39 pgs.

"U.S. Appl. No. 11/502,908, Notice of Allowance dated Aug. 4, 2009", 25 pgs.

"U.S. Appl. No. 11/502,908, Preliminary Amendment filed Oct. 12, 2006", 11 pgs.

"U.S. Appl. No. 11/502,908, Proposed Supplemental Amendment B filed Jul. 29, 2009", 14 pgs.

"U.S. Appl. No. 11/502,908, Substance of Interview filed Aug. 13, 2009", 1 pg.

"U.S. Appl. No. 11/581,211, Amendment A filed Dec. 16, 2008 om response to Non-Final Office Action dated Sep. 26, 2008", 12 pgs.

"U.S. Appl. No. 11/581,211, Amendment B filed May 14, 2009 in response to Non-Final Office Action dated Mar. 16, 2009", 13 pgs.

"U.S. Appl. No. 11/581,211, Amendment C filed Oct. 21, 2009 in response to Final Office Action dated Aug. 4, 2009", 11 pgs.

"U.S. Appl. No. 11/581,211, Amendment D filed Mar. 5, 2010 in response to Non-Final Office Action dated Nov. 9, 2009", 8 pgs.

"U.S. Appl. No. 11/581,211, Examiner Interview Summary dated May 11, 2009", 4 pgs.

"U.S. Appl. No. 11/581,211, Examiner Interview Summary dated Dec. 15, 2008", 4 pgs.

"U.S. Appl. No. 11/581,211, Final Office Action dated Aug. 4, 2009", 21 pgs.

"U.S. Appl. No. 11/581,211, Non Final Office Action dated Mar. 16, 2009", 26 pgs.

"U.S. Appl. No. 11/581,211, Non Final Office Action dated Sep. 26, 2008", 36 pgs.

"U.S. Appl. No. 11/581,211, Non-Final Office Action dated Nov. 9, 2009", 8 pgs.

"U.S. Appl. No. 11/581,211, Notice of Allowance dated Apr. 14, 2010", 6 pgs.

"U.S. Appl. No. 11/777,110, Amendment A filed Nov. 22, 2010 in response to Non-Final Office Action dated Aug. 20, 2010", 14 pgs.

"U.S. Appl. No. 11/777,110, Examiner Interview Summary dated Nov. 10, 2010", 3 pgs.

"U.S. Appl. No. 11/777,110, Final Office Action dated Feb. 4, 2011", 16 pgs.

"U.S. Appl. No. 11/777,110, Notice of Non-Complaint Amendment dated Nov. 30, 2010", 2 pgs.

"U.S. Appl. No. 11/777,110, Preliminary Amendment dated Oct. 11, 2007", 10 pgs.

"U.S. Appl. No. 11/777,110, Non Final Office Action dated Aug. 20, 2010", 26 pgs.

"U.S. Appl. No. 11/777,110, Supplemental Amendment filed Dec. 3, 2010 in response to Notice of Non-Complaint Amendment dated Nov. 30, 2010", 14 pgs.

"U.S. Appl. No. 11/830,652, Non Final Office Action dated Apr. 17, 2009", 39 pgs.

"U.S. Appl. No. 11/830,652, Non Final Office Action dated Oct. 5, 2009", 47 pgs.

"U.S. Appl. No. 11/830,670, Amendment A filed Nov. 22, 2010 in response to Non-Final Office Action dated Aug. 20, 2010", 14 pgs.

"U.S. Appl. No. 11/830,670, Final Office Action dated Feb. 9, 2011", 14 pgs.

"U.S. Appl. No. 11/830,670, Non Final Office Action dated Aug. 20, 2010", 25 pgs.

"U.S. Appl. No. 13/099,237, Non Final Office Action dated Feb. 22, 2013", 26 pgs.

"U.S. Appl. No. 13/894,118, Non Final Office Action dated Oct. 4, 2016", 27 pgs.

"U.S. Appl. No. 13/894,118, Preliminary Amendment filed May 15, 2013", 8 pgs.

"Binary XML Content Format Specification—Version 1.3", Wireless Application Protocol WAP-192-WBXML-20010725-a, (Jul. 25, 2001), 49 pgs.

Girardot, Marc, et al., "Millau: an encoding format for efficient representation and exchange of XMLover the Web", Computer Networks: The International Journal of Computer and Telecommunications Networking, 33(1-6), (Jun. 2000), 747-765.

Jeuring, Johan, et al., "Generic Programming for XML Tools", Institute of Information and Computer Science (Utrecht University), (May 27, 2002), 1-12.

Kanne, Carl-Christian, et al., "Efficient storage of XML data", In Proceedings of the 16th international Conference on Data Engineering, (Jun. 16, 1999), 19 pgs.

Sundaresan, Neel, et al., "Algorithms and Programming Models for Efficient Representation of XML for Internet Applications", www10, (May 1-5, 2001), 366-375.

Yalamanchi, A., et al., "Managing Expressions in a Database System", U.S. Appl. No. 60/378,018, filed May 10, 2002, 132 pgs.

Yoon, J. P., et al., "Schema Extraction for Multimedia XML Document Retrieval", Proceedings of the First International Conference on Web Information Systems Engineering (WISE'00)—vol. 2, (2000), 113-120.

(56) References Cited

OTHER PUBLICATIONS

Yoon, Jong P, "BitCube: A Three-Dimensional Bitmap Indexing for XML Documents", Journal of intelligent Information Systems, 17:2/3, (2001), 241-254.

Zhang, Z., et al., "Processing Structured Data", U.S. Appl. No. 11/830,670, filed Jul. 30, 2007, 33 pgs.

Zhang, Z., et al., "Processing Structured Data", U.S. Appl. No. 13/099,237, filed May 2, 2011, 22 pgs.

Zhang, Z., et al., "Processing Structured Data", U.S. Appl. No. 11/777,110, filed Jul. 12, 2007, 31 pgs.

* cited by examiner

PROCESSING STRUCTURED DATA

CROSS REFERENCE TO RELATED APPLICATIONS

This application is a continuation of U.S. patent application Ser. No. 13/894,118, filed May 14, 2013, entitled "PROCESSING STRUCTURED DATA," which is a continuation of U.S. patent application Ser. No. 11/777,110, filed Jul. 12, 2007, entitled "PROCESSING STRUCTURED DATA," which is a continuation-in-part of U.S. patent application Ser. No. 11/581,211 filed Oct. 13, 2006, U.S. Pat. No. 7,761,459, entitled "PROCESSING STRUCTURED DATA," which is a continuation-in-part of U.S. patent application Ser. No. 10/272,077, filed Oct. 15, 2002, now U.S. Pat. No. 7,133,857, issued Nov. 7, 2006, entitled "PROCESSING STRUCTURED DATA," all of which are hereby incorporated by reference.

FIELD OF THE INVENTION

The present invention relates to the field of structured data files in computer systems. More specifically, the present invention relates to the processing of structured data in an efficient manner.

BACKGROUND OF THE INVENTION

Structured data represents a large portion of the information accessed on the Internet and other computer networks. There are several reasons why structured data is so popular. American Standard Code for Information Interchange (ASCII) and its extensions, such as Unicode Transformation Formats UTF-8 and UTF-16 are among the most common standard encoding formats. Text encoding puts information into a format that is easily readable by a human, thus it is easy for programmers to develop and debug applications. Lastly, textual encoding is extensible and adding new information may be as simple as adding a new key-value pair.

Recently, Extensible Markup Language (XML) has been growing in popularity. XML is a markup language for documents containing structured information. Unlike its predecessor, Hypertext Markup Language (HTML), where tags are used to instruct a web browser how to render data, in XML the tags are designed to describe the data fields themselves. XML, therefore, provides a facility to define tags and the structural relationships between them. This allows a great deal of flexibility in defining markup languages to using information. Because XML is not designed to do anything other than describe what the data is, it serves as the perfect data interchange format.

XML, however, is not without its drawbacks. Compared with other data formats, XML can be very verbose. Processing an XML file can be very CPU and memory intensive, severely degrading overall application performance. Additionally, XML suffers many of the same problems that other software-based text-based processing methods have. Modern processors prefer binary data representations, particularly ones that fit the width of the registers, over text-based representations. Furthermore, the architecture of many general-purpose processors trades performance for programmability, thus making them ill-suited for text processing. Lastly, the efficient parsing of structured text, no matter the format, can present a challenge because of the added steps required to handle the structural elements.

Most current XML parsers are software-based solutions that follow either the Document Object Model (DOM) or Simple API for XML (SAX) technologies. DOM parsers convert an XML document into an in-memory hierarchical representation (known as a DOM tree), which can later be accessed and manipulated by programmers through a standard interface. SAX parsers, on the other hand, treat an XML document as a stream of characters. SAX is event-driven, meaning that the programmer specifies an event that may happen, and if that event occurs, SAX gets control and handles the situation.

In general, DOM and SAX are complementary, not competing, XML processing models, each with its own benefits and drawbacks. DOM programming is programmer-friendly, as the processing phase is separate from application logic. Additionally, because the data resides in the memory, repetitive access is fast and flexible. However, DOM requires that the entire document data structure, usually occupying 7-10 times the size of the original XML document, be loaded into the memory, thus making it impractical for large XML documents. SAX, on the other hand, can be efficient in parsing large XML documents (at least when only small amounts of information need to be processed at once), but it maintains little of the structural information of the XML data, putting more of a burden on programmers and resulting in code that is hardwired, bulky, and difficult to maintain.

What is needed is an application program interface (API) that combines the best attributes of both DOM and SAX parsing.

BRIEF DESCRIPTION OF THE INVENTION

The present invention provides a fast and efficient way of processing structured data by utilizing an intermediate file to store the structural information. The structured data may be processed into a Binary mask Format (BMF) file which may serve as a starting point for post-processing. A tree structure built on top of the BMF file may be constructed very quickly, and also takes up less space than a DOM tree. Additionally, BMF records may reside entirely in the memory and contain structural information, allowing SAX-like sequential data access.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1:
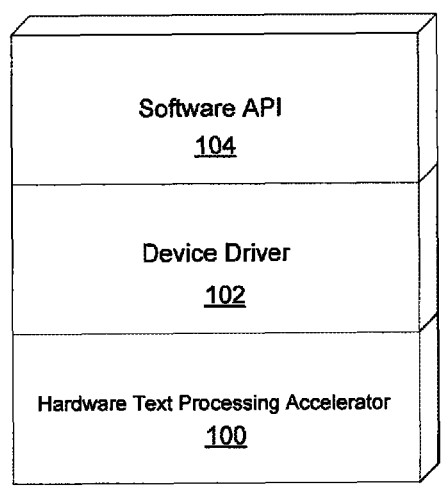
FIG. 1 is a block diagram illustrating a layer view of an apparatus for efficiently processing structured data in accordance with an embodiment of the present invention.

Embodiments of the present invention are described herein in the context of a system of computers, servers, and software. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

For purposes of this disclosure, a structured data file is any file containing content as well as some information regarding the structural organization of the content. The present invention provides a fast and efficient way of processing structured data by utilizing an intermediate file to store the structural information. The structured data may be processed into a Binary mask Format (BMF) file which may serve as a starting point for post-processing. A tree structure built on top of the BMF file may be constructed very quickly, and also takes up less space than a DOM tree. Additionally, BMF records may reside entirely in the memory and contain structural information, allowing SAX-like sequential data access. However, while this document will describe advantages that the present invention provides over DOM or SAX, one of ordinary skill in the art will recognize that the present invention need not be limited to replacing DOM or SAX, and can be expanded to non-XML type processing.

FIG. 1 is a block diagram illustrating a layer view of an apparatus for efficiently processing structured data in accordance with an embodiment of the present invention. The apparatus may comprise three layers. A hardware text processing accelerator 100, occupying the lowest layer, may offer the horsepower necessary to relieve the central processing unit (CPU) from the most processor intensive part of the task. On top of the hardware text processing accelerator 100 may lie a device driver layer 102 that is responsible for the communication between the hardware text processing accelerator 100 and a software layer 104. The software layer 104 may be designed to offer maximum flexibility and further improve the performance. It may export APIs that are standard-compliant.

Figure 2:
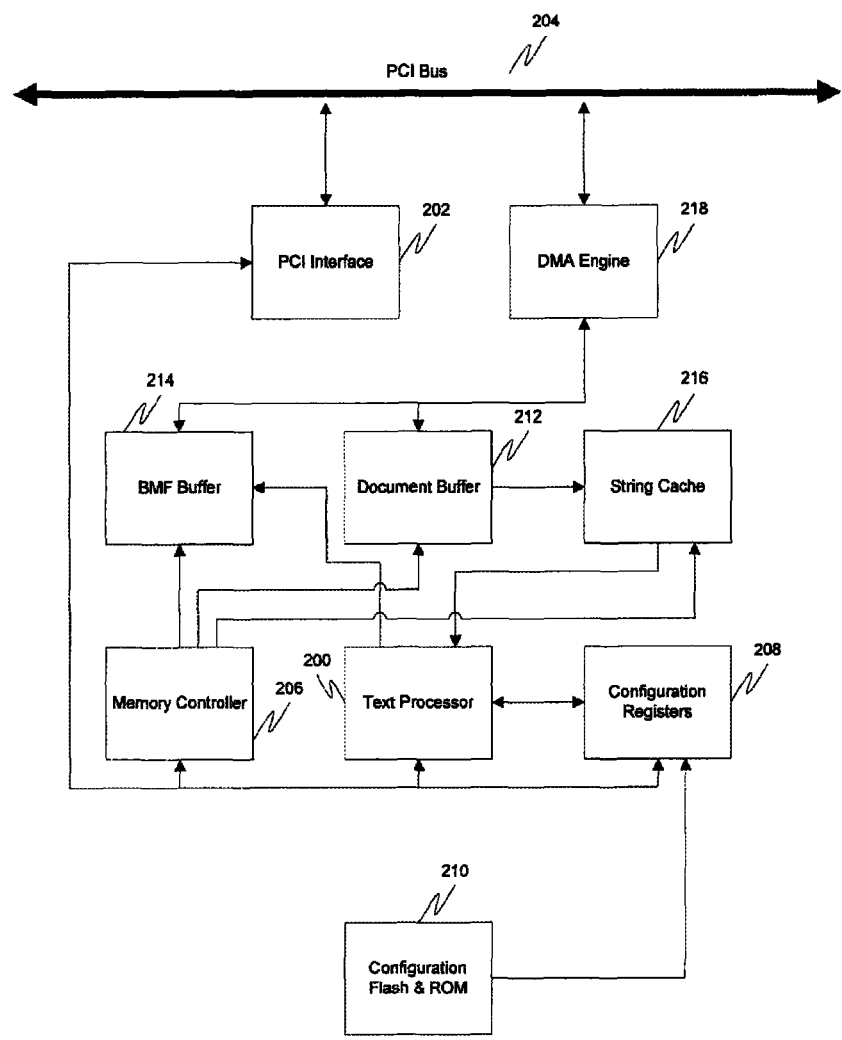
FIG. 2 is a block diagram illustrating an apparatus for efficiently processing structured data in accordance with an embodiment of the present invention.

The hardware may be designed such that it may quickly match multiple patterns against an incoming data stream. FIG. 2 is a block diagram illustrating an apparatus for efficiently processing structured data in accordance with an embodiment of the present invention. A text processor 200 may be the core of the accelerator. It may be composed of multiple Finite State Machines (FSMs) that process an incoming document in parallel. The output may be the BMF file. It also may set several result registers (not pictured). A PCI interface 202 may handle all handshaking between the hardware and a server PCI bus 204. A memory controller 206 may receive commands from the PCI interface 202 and convert the PCI address to on-board memory address space. It also may access the board memory accordingly. Configuration registers 208 may determine the configuration of the text processing pipeline and the organization of the memory controller 206. It may load default values from configuration ROM 210. Some of the values may be modified by software through the PCI interface 202. The Configuration ROM 210 may store the default setting of the text processor configuration. It also may store the configuration map of FPGAs.

A document buffer 212 may store the incoming document. This may be a Synchronous Dynamic Random Access Memory (SDRAM). Paging may be utilized if the incoming document is larger than the total buffer size. A BMF buffer 214 may store the output BMF files, together with several other text processor result register values. This may be a separate SDRAM, although in one embodiment of the present invention it may share a single SDRAM with the document buffer. A string cache 216 may buffer the incoming data to smooth out and speed up SDRAM access. A DMA engine 218 may grab the frame data from server main memory and send it back the BMF file.

Figure 3:
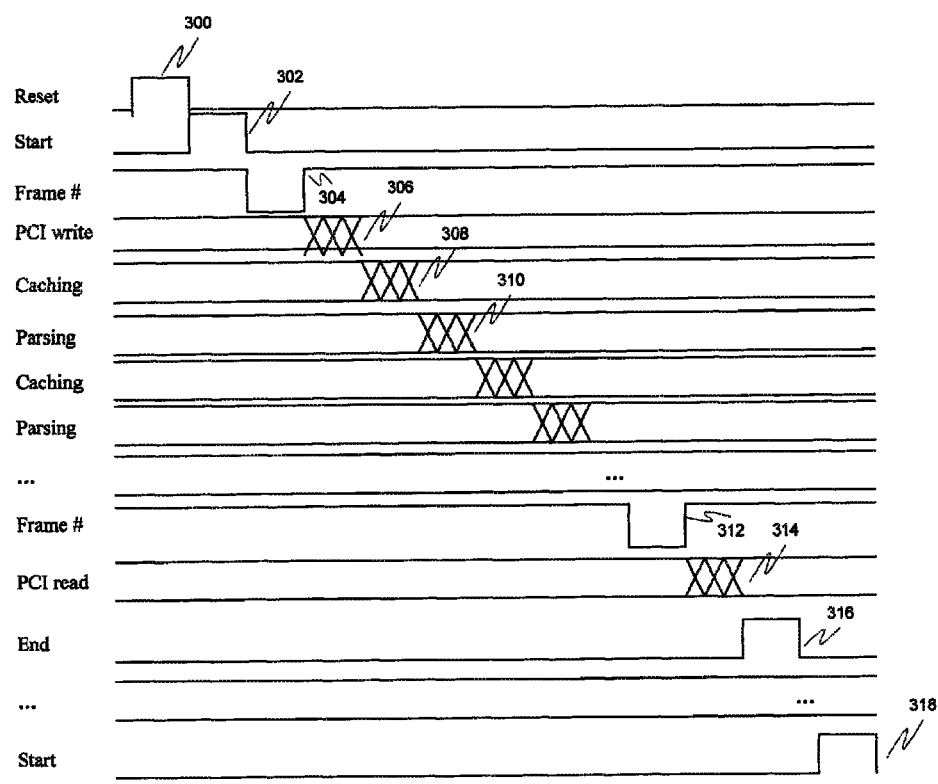
FIG. 3 is a timing diagram illustrating the operation of the hardware in accordance with an embodiment of the present invention.

FIG. 3 is a timing diagram illustrating the operation of the hardware in accordance with an embodiment of the present invention. A reset 300 may be sent out by the host computer system, or by a specific application. While reset is asserted, the configuration may be loaded from ROM to the configuration registers. The text processor then may be set to a default state according to the configuration registers. When software calls the device driver, a start signal 302 may be sent through the PCI to indicate the beginning of a document processing cycle. Then the PCI master may assert a frame number 304 to indicate the beginning of a write transaction. The PCI master may then drive the address/data 306 to the PCI bus. The PCI target interface may respond, causing the DMA to read the document into the SDRAM document buffer 308. There may also be certain PCI commands reserved to update the configuration registers. The memory controller may be activated by PCI command. It may start processing data in the string buffer 310. It also may send sync signals to the memory controller. The transferring and processing may be repeated.

The PCI target may sense a valid window to send data. Then the PCI master may assert the frame number to indicate the beginning of a read transaction 312. The PCI target holds the bus. The DMA engine may then transfer the BMF and result register data to main memory 314. When all the data is transferred, the PCI target interface may send an end signal to the device driver 316. The next document processing cycle may start again with a start signal from the device driver 318.

The output of the hardware is a BMF. In one embodiment of the present invention, the BMF defines a binary record format that is used to describe various fields in a structured data file. It can be viewed as a two-dimensional field of bits. Each piece of useful information in the structured data file may correspond to a record in the BMF file. A record may comprise a starting offset and length of a target string in the structured data file. It may also comprise the depth value, node type, and bit-wide flags. These will be discussed in more detail below. The total length of a record may be an integer multiple of a 32-bit word—the width of the memory bus in most commercial architectures. Two record types may be defined: a full version of 12 bytes in length, and a compressed version of 8 bytes in length. The full version may be based on the assumption that both the string length and the starting offset are 32-bits wide, whereas the compressed version may assume a 16-bit field, which translates to a maximum length of 65536 bytes.

Figure 4:
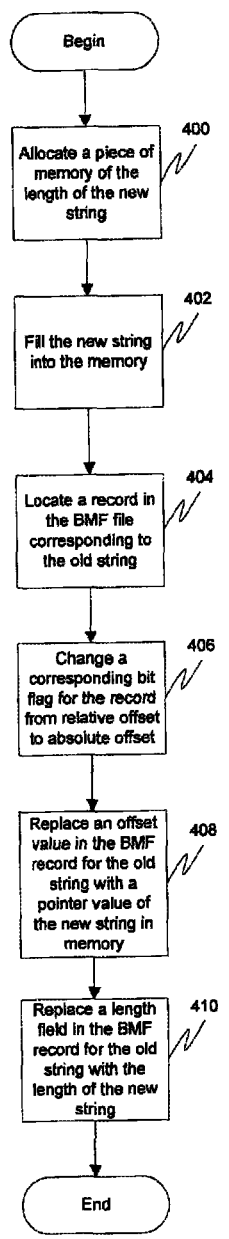
FIG. 4 is a flow diagram illustrating a method for modifying the content of a target string in a BMF file from an old string to a new string in accordance with an embodiment of the present invention.

FIG. 4 is a flow diagram illustrating a method for modifying the content of a target string in a BMF file from an old string to a new string in accordance with an embodiment of the present invention. At 400, a piece of memory of the length of the new string may be allocated. At 402, the new string may be filled into the memory. At 404, a record in the BMF file corresponding to the old string may be located. At 406, a corresponding bit flag for the record may be changed from relative offset to absolute offset. The first time a file is converted to BMF form, relative offsets may be used. However, as soon as a modification is made to a specific string, it can often be difficult if not impossible to continue to track the relative offset for that string. Therefore, absolute offsets may be utilized for all modified strings. At 408, an offset value in the BMF record for the old string may be replaced with a pointer value of the new string in memory. At 410, a length field in the BMF record for the old string may be replaced with the length of the new string.

There are at least three types of possible BMF file modes: read-only mode, read-modify mode, and read-modify-add mode. In read-only mode, records representing various types of nodes may be placed sequentially into a BMF file, leaving no empty records. For example, a leaf-level element may be represented as a record for the starting tag, 2n records (one of r property name and one property value) for n properties, and one record for the text for the element, and finally one record for an ending tag name. The presence of the ending tag record may be used for document validation.

The read-modify mode may be identical to read-only mode except each record allows for limited write-access, meaning content can be altered, but not added.

The read-modify-add mode allows complete write-access, which is done by embedding empty records into the file.

The record format may be picked to efficiently represent the necessary information of the original data structure. It may also be made less efficient on purpose to speed up downstream processing.

Figure 5:
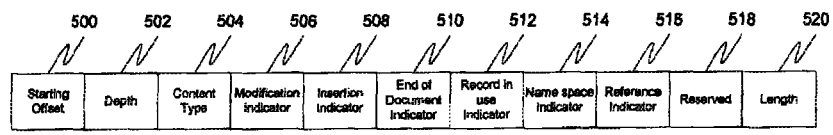
FIG. 5 is a diagram illustrating a BMF record format in accordance with an embodiment of the present invention.

FIG. 5 is a diagram illustrating a BMF record format in accordance with an embodiment of the present invention. A control word 500 may be thirty-two bits in total in this embodiment. This may include a depth value 502 of sixteen bits. The depth value may indicate the depth of a tag in the hierarchy of tags in the structured data file. Thus, the first tag in a file will have a depth of zero, whereas if another starting tag appears before an ending tag for the first tag, that second starting tag will have a depth of one. A content type 504 may be provided, which indicates what type of information the content is. In an embodiment of the present invention, the following value/content type pairs may be used in this field:

TABLE 1

Content Types and Corresponding Values

| Content Type Value | Content name | Example |
|---|---|---|
| 0 | Starting Tag | <example> |
| 1 | Ending Tag | </example> |
| 2 | Property Name | <example property1="this"> |
| 3 | Property Value | <example property2="that"> |
| 4 | Text | <example> tasty fruit </example> |
| 5 | Comment | <!- - this is a comment - -> |
| 6 | Processing Instruction | <? ...... ?> |
| 7 | Markup declaration I name | <![CDATA[...<<<>>>...]]> |
| 8 | Markup declaration I value | <![CDATA[...<<<>>>...]]> |
| 9 | Markup declaration II name | <!ENTITY ...> |
| 10 | Markup declaration II value | <!ENTITY ...> |
| 11 | Entity reference | &example.bib; |
| 12 | Property Name Value Pair | <example property1="this"> |
| 13 | Starting tag for empty element | <example/> |

A modification indicator 506 may also be provided, which indicates whether or not the record has been modified. This is important because, as described above, if the record has been modified, then the offset field will contain the real pointer value, not a relative offset. An insertion indicator 508 may indicate that data was inserted in between two existing records. Once again, this is important in determining how to utilize the offset field. If the insertion indicator is set to 1, it indicates that the offset field contains a pointer to an external piece of memory, one that can be used to add child nodes to the current node. An end of document indicator 510 may indicate whether the tag is the last one in the document. This can be important because in some embodiments, ending tags may be ignored when encoding the BMF file in order to save space. Therefore, the last tag in the BMF file may not correspond to the last tag in the structured data file.

A current record in use field 512 may be used to indicate that a record has been deleted. If the field is set to 0, the record may be safely ignored because it has been deleted. A name space indicator 514 may indicate whether or not there is a name space within the token (which may be represented by an "=" sign). A reference bit 516 may indicate when there is an external reference, such as an "&" in a text string.

There may be one or more reserved bits 518, which are set aside for future uses. Lastly, a length field 520 may indicate the length of the content.

The BMF file, together with the original data in memory, completely describes the original data and its inherent data structure. Traversing the data structure may be easily accomplished using the BMF records. Higher level applications and processing are therefore facilitated by using the BMF. To make it easily accessible and readily integrated to higher level application and processing, device drivers and an application programming interface (API) may be built on top of the BMF.

Figure 6:
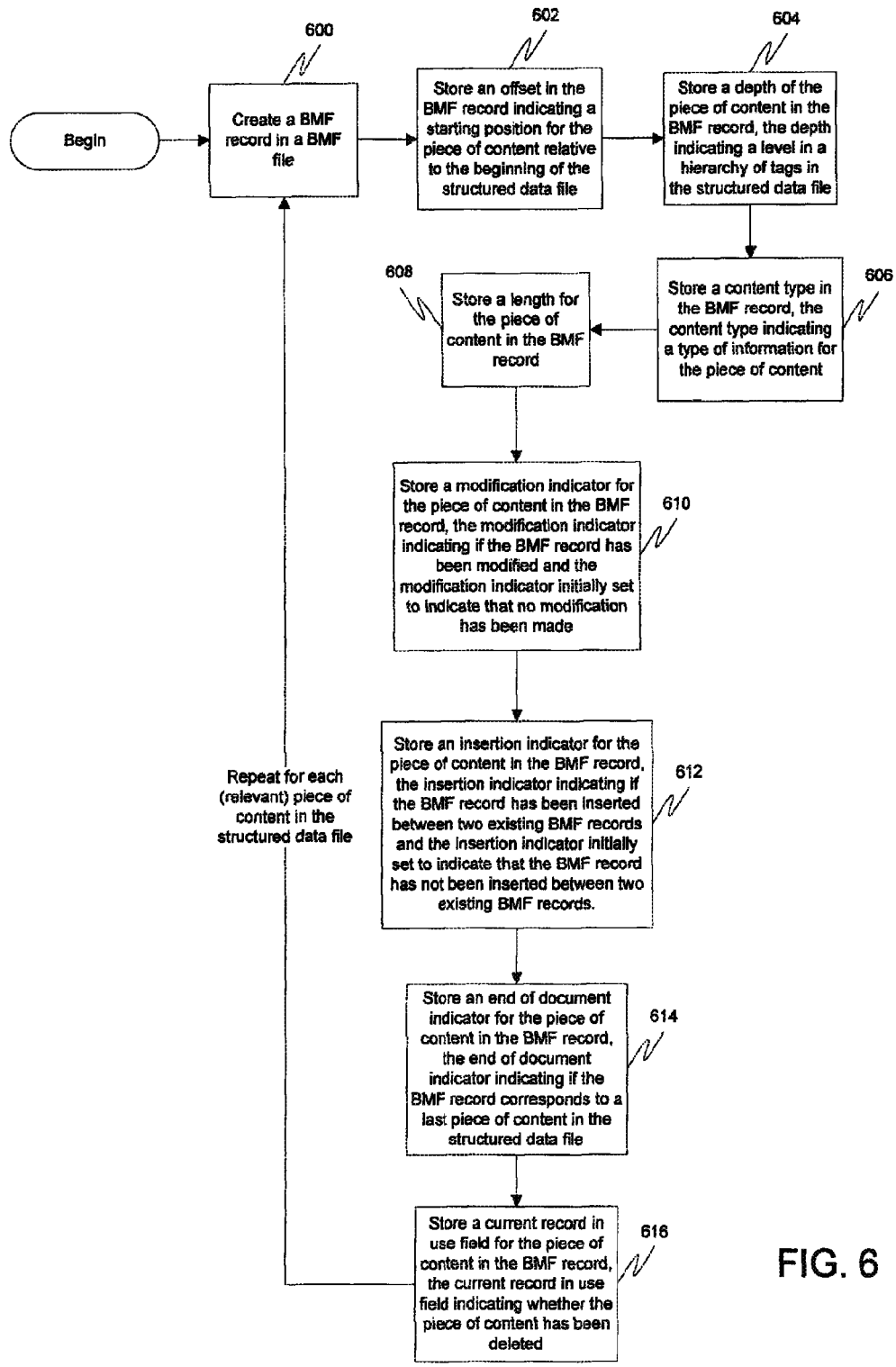
FIG. 6 is a flow diagram illustrating a method for efficiently processing a structured data file, the structured data file including one or more pieces of content, in accordance with an embodiment of the present invention.

FIG. 6 is a flow diagram illustrating a method for efficiently processing a structured data file, the structured data file including one or more pieces of content, in accordance with an embodiment of the present invention. The structured data file may be an extensible markup language file. The process loops through each piece of content. In another embodiment of the present invention, the process loops through each relevant piece of content. Relevancy can be determined by the programmer and may be chosen so as to minimize the amount of space used for a BMF file. At 600, a BMF record is created in a BMF file, the BMF record corresponding to the piece of content. At 602, an offset may be stored in the BMF record indicating a starting position for the piece of content relative to the beginning of the structured data file. At 604, a depth of the piece of content may be stored in the BMF record, the depth indicating a level in a hierarchy of tags in the structured data file. At 606, a content type of the piece of content may be stored in the BMF record, the content type indicating a type of information for the piece of content. The content type may take many forms, such as a starting tag, ending tag, property name, property value, text, comment, processing instruction, markup declaration name, markup declaration value, external reference, property name pair, etc. At 608, a length may be stored for the piece of content in the BMF record.

At 610, a modification indicator for the piece of content may be stored in the BMF record, the modification indicator indicating if the BMF record has been modified and the modification indicator initially set to indicate that no modification has been made. At 612, an insertion indicator for the piece of content may be stored in the BMF record, the insertion indicator indicating if the BMF record has been inserted between two existing BMF records and the insertion indicator initially set to indicate that the BMF record has not been inserted between two existing BMF records. At 614, an end of document indicator for the piece of content may be stored in the BMF record, the end of document indicator indicating if the BMF record corresponds to a last piece of content in the structured data file. At 616, a current record in use field may be stored for the piece of content in the BMF record, the current record in use field indicating whether the piece of content has been deleted.

The following example may be used to illustrate an embodiment of the present invention. One of ordinary skill in the art will recognize that this is merely an example and should not be read to be limiting in any way. Suppose an XML file as follows:

```
<?xml version="1.0" encoding="US-ASCII"?>
<benchmark:database xmlns:benchmark="http://example.com/xml/benchmark">
<benchmark:person id="012345">
<benchmark:email name="Name012345" />
<!--Edited with XML spy v4.2 -->
<benchmark:line1>Line1012345 012345</benchmark:line1>
</benchmark:person>
</benchmark:database>
```

An embodiment of the present invention may ignore ending tags and produce the following BMF file:

| Starting offset 32 bit | Depth 5 bit | Token type 4 bit | Modify indicator 1 bit | Insertion Indicator 1 bit | End of Document Indicator 1 bit | Current Record in use 1 bit | Name space indicator 1 bit | Reference indicator | unused | Length 16 bit |
|---|---|---|---|---|---|---|---|---|---|---|
| 2   | 0 | 6 | 0 | 0 | 0 | 1 | 0 | 0 | 0 | 38 |
| 42  | 0 | 0 | 0 | 0 | 0 | 1 | 1 | 0 | 0 | 18 |
| 61  | 0 | 2 | 0 | 0 | 0 | 1 | 1 | 0 | 0 | 14 |
| 78  | 0 | 3 | 0 | 0 | 0 | 1 | 0 | 0 | 0 | 35 |
| 116 | 1 | 0 | 0 | 0 | 0 | 1 | 1 | 0 | 0 | 16 |
| 133 | 1 | 2 | 0 | 0 | 0 | 1 | 0 | 0 | 0 | 2  |
| 137 | 1 | 3 | 0 | 0 | 0 | 1 | 0 | 0 | 0 | 6  |
| 147 | 2 | 0 | 0 | 0 | 0 | 1 | 1 | 0 | 0 | 15 |
| 163 | 2 | 2 | 0 | 0 | 0 | 1 | 0 | 0 | 0 | 4  |
| 169 | 2 | 3 | 0 | 0 | 0 | 1 | 0 | 0 | 0 | 10 |
| 185 | 1 | 5 | 0 | 0 | 0 | 1 | 0 | 0 | 0 | 25 |
| 218 | 2 | 0 | 0 | 0 | 0 | 1 | 1 | 0 | 0 | 15 |
| 234 | 2 | 4 | 0 | 0 | 0 | 1 | 0 | 0 | 0 | 23 |
| 0   | 0 | 0 | 0 | 0 | 1 | 1 | 0 | 0 | 0 | 0  |

The packet BMF records are:

```
00000000000000000000000000000010  00000  0110  0 0 0 1 0 0 0  00100110
00000000000000000000000000101010  00000  0000  0 0 0 1 1 0 0  00010010
00000000000000000000000000111101  00000  0010  0 0 0 1 1 0 0  00001110
00000000000000000000000001001110  00001  0011  0 0 0 1 0 0 0  00100011
00000000000000000000000001110100  00001  0000  0 0 0 1 1 0 0  00010000
00000000000000000000000010000101  00001  0010  0 0 0 1 0 0 0  00000010
00000000000000000000000010001001  00010  0011  0 0 0 1 0 0 0  00000110
00000000000000000000000010010011  00010  0000  0 0 0 1 1 0 0  00001111
00000000000000000000000010100011  00010  0010  0 0 0 1 0 0 0  00000100
00000000000000000000000010101001  00001  0011  0 0 0 1 0 0 0  00001010
00000000000000000000000010111001  00010  0101  0 0 0 1 0 0 0  00011001
00000000000000000000000011011010  00010  0000  0 0 0 1 1 0 0  00001111
00000000000000000000000011101010  00010  0100  0 0 0 1 0 0 0  00010111
00000000000000000000000000000000  00000  0000  0 1 1 1 0 0 0  00000000
```

Currently, DOM (a W3C standard) is well-defined and the most widely used representation of XML's inherent hierarchy. DOM represents an XML document as a tree structure, with the elements, attributes, and text defined as nodes. A node may have a single parent node, sibling nodes and child nodes. For example, consider the following XML snippet:

```
<A>text0 <B1 attrName="val"><C1>text1</C1><C2>text2
</C2></B1><B2></B2><B3></B3></A>
```

The node named "B1" has a parent node named "A." It also has two child nodes, respectively named "C1" and "C2." The "C1" node is the first child node as it appears before the "C2" node in the XML text. The "B1" node also has sibling nodes named "text0", "B2" and "B3" respectively. The text node named "Text 0" is the previous sibling of the node "B1." The "B2" is the next sibling for "B1" node as it appears before "B3" node. By the same token, the "B3" node is the next sibling node for "B2" node. Also the first and only child of the "C1" node is a text node named "text."

DOM treats attribute nodes differently. In the XML snippet shown above, the "B1" node doesn't treat its attribute named "attrName" as its child.

Many DOM node types have their equivalent BMF types. For example, an element type in DOM corresponds to the starting tag. DOM, however, does not have a node type corresponding to BMF's ending tag type.

Since a BMF file completely describes the inherent structure in the data file as one can navigate the document by scanning across of BMF records and keeping track of their token types. And they don't need any additional descriptors to identify its siblings, children, or parent. The inclusion of ending tag as a type is important. DOM resorts to various pointers and complex data structures to maintain the hierarchical information of XML, and does not have a node type corresponding to ending tag. SAX returns ending tags of XML, but discards them by default. In contrast, a BMF file maintains the ending tag in memory as a record so the structure information of an XML file is unambiguous. Consider the following examples:

EXAMPLE 1

<a><b1></b1><b2></b2></a>

EXAMPLE 2

<a><b1><b2></b2></b1></a>

If the ending tags are missing, the corresponding BMF have identical record types
Starting tag for a
Starting tag for b1
Starting tag for b2

Without ending tags, it will be difficult to determine whether b2 is the sibling, or child, of b2. With ending tags, one can clearly tell the relationship between b1 and b2 in the above examples.

In Example 1, the token types are:
Starting tag for a
Starting tag for b1
Ending tag for b1
Starting tag for b2
Ending tag for b2
Ending tag for a
In Example 2, the token types are:
Starting tag for a
Starting tag for b1
Starting tag for b2
Ending tag for b2
Ending tag for b1
Ending tag for a To tell whether b is a sibling, or child, of b2, one can calculate the depth value of each tags. In example 1, b1 and b2 both have the same depth value so they are siblings. In example 2, b1 and b2 have depth value of 1 and 2 respectively, so b2 is the child of b1.

When the depth value is included in the BMF records, ending tags can be ignored to save space.

For BMF records to maintain structural information of XML documents containing empty elements (elements having no content, denoted by a specially defined starting tag that indicates an empty element), there are at least two options.

The first option is to assign the starting tag of an empty element a content type that is different from a starting tag of a non-empty element. Consider the following XML: <root><element/></root>. Its corresponding BMF file may contain three BMF records: the first one for "root" as a non-empty starting tag, the second for "element" as an empty starting tag, and the third for the ending tag for "</root>." When the BMF records choose to include a depth value, the ending tag's BMF record may be ignored.

The second option is to use the same content type for both empty and non-empty starting tag, and to insert a BMF record of a "dummy" ending tag for an empty starting tag. The dummy tag can take various forms, all aiming to preserve the structural integrity of the BMF file. For example, one can insert a BMF record corresponding to a zero-length ending tag at the end of an empty element. Or alternatively, he can add a BMF record for ">" or "/>" to emulate the ending tag. It is called a "dummy" because it doesn't represent a real ending tag.

In some cases, it would be beneficial to have some additional way to speed up the traversal of document structure. For example, a BMF record can contain a 32-bit descriptor which contains the reference in various forms, such as the relative index value, absolute index value or memory address, of the next sibling or first child, but not both, as there is additional storage overhead for having such descriptors.

The reference to the next sibling makes it possible to jump to the next sibling without scanning the BMF records between the current record and its next sibling. The reference to the first child record makes it possible to jump to the first child without scanning the BMF records between the current record and first child record. Some of the other possible references a BMF record can have are parent, root, previous sibling, last child. It should be noted that the reference to a child node is actually a reference to a record corresponding to the child node, as the nodes are represented in the intermediate file as records. Likewise the reference to a next sibling node is actually a reference to a record corresponding to the next sibling node.

When a record does not have a sibling, it is convenient to use some constant value to denote the absence of the sibling. That constant value can be thought of as a special reference value. For example, a constant value of zero at the descriptor field could be interpreted as there is not sibling or child, depending on the actual usage of the descriptor.

The concept outlined in this specification can also be applied to processing JSON (JavaScript Object Notion). JSON is invented to allow web browsers to exchange data structure easily as a JSON string has browser's default support, such as Javascript's eval( ).

XML and JSON are similar as both represent tree-structure and are human readable. The basic textual content types in JSON are keys and values. Consider the following XML file:

```
<menu id="file" value="File">
  <popup>
    <menuitem><value>New</value><onclick>CreateNewDoc( )
    </onclick>
  </menuitem>
    <menuitem><value>Open</value><onclick>OpenDoc( )
    </onclick> </menuitem>
    <menuitem><value>Close</value><onclick>CloseDoc( )
    </onclick></menuitem>
  </popup>
</menu>
The equivalent JSON representation is shown below
{"menu": {
  "id": "file",
  "value": "File",
  "popup": {
    "menuitem": [
      {"value": "New", "onclick": "CreateNewDoc( )"},
      {"value": "Open", "onclick": "OpenDoc( )"},
      {"value": "Close", "onclick": "CloseDoc( )"}
    ]
  }
}}
```

The '{' and '}' in JSON delimit a new level of nesting. For example, in the JSON example above, the key "popup" has a value following ":" and because there is a '{,' it just indicates that there is a next level of nesting, potentially consisting of a new key value pair. To extend BMF for JSON processing, there needs to be content types "left brace" and "right brace" respectively corresponding to '{' and '}.' Consider the JSON file below: {"menu": {"id": "file"}}

To create its corresponding BMF file, one inserts a BMF record for '{' whose content type is left brace, a BMF record for the "menu" whose content type is "key," a BMF record for "{" whose content type is "left brace," a BMF record for "id" whose content type is "key," a BMF record for "file" whose content type is "value," a BMF record for "}" whose content type is "right brace," and a BMF record for "}" whose content type is "right brace." Table 2 summarizes the content types for the above example.

TABLE 2

Content types and values for the JSON files

| JSON Content Value | JSON Content Name | Example |
|---|---|---|
| 0 | Left brace | {"id": "file"} |
| 1 | Right brace | {"id": "file"} |
| 2 | Key | {"id": "file"} |
| 3 | Value | {"id": "file"} |

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for efficiently processing a structured data file, the structured data file including one or more pieces of content, comprising:
  parsing the structured data file by:
    creating a first record in an intermediate file, the first record corresponding to a starting tag in the structured data file and having information regarding the starting tag and a content type field identifying the first record as a starting tag type;
    creating a second record in the intermediate file, the second record corresponding to a piece of content in the structured data file, the second record containing one or more descriptors containing information regarding the property name, wherein the second record includes an offset indicting a position for said piece of content relative to a point in said structured data file;
    creating a third record in the intermediate file, the third record corresponding to a piece of content in the structured data file, the third record containing one or more descriptors containing information regarding the property value, wherein the third record includes an offset indicting a position for said piece of content relative to a point in said structured data file;
    creating a fourth record in the intermediate file, the fourth record corresponding to a piece of content in the structured data file, the fourth record containing one or more descriptors containing information regarding the content, wherein the fourth record includes an offset indicting a position for said piece of content relative to a point in said structured data file;
    creating a fifth record in the intermediate file, the fifth record corresponding to an ending tag in the structured data file and having information regarding the ending tag and a content type field identifying the fifth record as an ending tag type; and
  formatting said intermediate file in a way that allows data from the structured data file to be accessed using both said intermediate file and the structured data file together.

2. The method of claim 1, wherein said creating a second record comprises:
  creating a binary mask format (BMF) record in the intermediate file, the BMF record corresponding to said piece of content.

3. The method of claim 1, wherein said intermediate file is a BMF file, wherein the BMF file includes one or more BMF records.

4. The method of claim 2, wherein said creating a second record further comprises:
  storing a depth value of said piece of content in said BMF record, said depth value indicating a level in a hierarchy of tags in said structured data file.

5. The method of claim 2, wherein said creating a second record further comprises:
  storing a content type of said piece of content in said BMF record, said content type indicating a type of information for said piece of content.

6. The method of claim 2, wherein said creating a second record further comprises:
  storing a length for said piece of content in said BME record.

7. The method of claim 2, wherein said offset indicates a starting position for said piece of content relative to a beginning of the structured data file.

8. The method of claim 4, wherein the formatting includes formatting said record in a way that allows data to be accessed using both said intermediate file and the structured data file without traversing the entire structured data file to determine the depth value.

9. An apparatus for efficiently processing structured data, comprising:
  a peripheral component interface (PCI) interface;
  a direct memory access (DMA) engine coupled to said PCI interface;
  a text processor coupled to said PCI interface, the text processor configured to parse a structured data the by:

creating a first record in an intermediate file, the first record corresponding to a starting tag in the structured data file and having information regarding the starting tag and a content type field identifying the first record as a starting tag type;

creating a second record in the intermediate file, the second record corresponding to a piece of content in the structured data file, the second record containing one or more descriptors containing information regarding the property name, wherein the second record includes an offset indicting a position for said piece of content relative to a point in said structured data file;

creating a third record in the intermediate file, the third record corresponding to a piece of content in the structured data file, the third record containing one or more descriptors containing information regarding the property value, wherein the third record includes an offset indicting a position for said piece of content relative to a point in said structured data file;

creating a fourth record in the intermediate file, the fourth record corresponding to a piece of content in the structured data file, the fourth record containing one or more descriptors containing information regarding the content, wherein the fourth record includes an offset indicting a position for said piece of content relative to a point in said structured data file;

creating a fifth record in the intermediate file, the fifth record corresponding to an ending tag in the structured data file and having information regarding the ending tag and a content type field identifying the fifth record as an ending tag type; and formatting said intermediate file in a way that allows data from the structured data file to be accessed using both said intermediate file and the structured data file together.

10. The apparatus of claim 9, wherein said creating a second record comprises:
creating a binary mask format (BMF) record in the intermediate file, the BMF record corresponding to said piece of content.

11. The apparatus of claim 9, wherein said intermediate file is a BMF file, wherein the BMF file includes one or more BMF records.

12. The apparatus of claim 10, wherein said creating a second record further comprises:
storing a depth value of said piece of content in said BMF record, said depth value indicating a level in a hierarchy of tags in said structured data file.

13. The apparatus of claim 10, wherein said creating a second record further comprises:
storing a content type of said piece of content in said BMF record, said content type indicating a type of information for said piece of content.

14. The apparatus of claim 10, wherein said creating a second record further comprises:
storing a length for said piece of content in said BME record.

15. The apparatus of claim 10, wherein said offset indicates a starting position for said piece of content relative to a beginning of the structured data file.

16. The apparatus of claim 12, wherein the formatting includes formatting said record in a way that allows data to be accessed using both said intermediate file and the structured data file without traversing the entire structured data file to determine the depth value.

17. A non-transitory storage device readable by a machine, tangibly embodying a program of instructions executable by the machine to perform a method for efficiently processing a structured data file, the structured data file including one or more pieces of content, the method comprising:

parsing the structured data file by:
creating a first record in an intermediate file, the first record corresponding to a starting tag in the structured data file and having information regarding the starting tag and a content type field identifying the first record as a starting tag type;

creating a second record in the intermediate file, the second record corresponding to a piece of content in the structured data file, the second record containing one or more descriptors containing information regarding the property name, wherein the second record includes an offset indicting a position for said piece of content relative to a point in said structured data file;

creating a third record in the intermediate file, the third record corresponding to a piece of content in the structured data file, the third record containing one or more descriptors containing information regarding the property value, wherein the third record includes an offset indicting a position for said piece of content relative to a point in said structured data file;

creating a fourth record in the intermediate file, the fourth record corresponding to a piece of content in the structured data file, the fourth record containing one or more descriptors containing information regarding the content, wherein the fourth record includes an offset indicting a position for said piece of content relative to a point in said structured data file;

creating a fifth record in the intermediate file, the fifth record corresponding to an ending tag in the structured data file and having information regarding the ending tag and a content type field identifying the fifth record as an ending tag type; and formatting said intermediate file in a way that allows data from the structured data file to be accessed using both said intermediate file and the structured data file together.

18. The non-transitory storage device of claim 17, wherein said creating a second record comprises:
creating a binary mask format (BMF) record in the intermediate file, the BMF record corresponding to said piece of content.

19. The non-transitory storage device of claim 17, wherein said intermediate file is a BMF file, wherein the BMF file includes one or more BMF records.

20. The non-transitory storage device of claim 18, wherein sad creating a second record further comprises:
storing a depth value of said piece of content in said BMF record, said depth value indicating a level in a hierarchy of tags in said structured data file.

* * * * *

UNITED STATES PATENT AND TRADEMARK OFFICE
CERTIFICATE OF CORRECTION

PATENT NO. : 9,990,364 B2
APPLICATION NO. : 15/393481
DATED : June 5, 2018
INVENTOR(S) : Zhengyu Zhang Page 1 of 1

It is certified that error appears in the above-identified patent and that said Letters Patent is hereby corrected as shown below:

On the Title Page

On page 2, in Column 1, item (56) under "Other Publications", Line 33, delete "om" and insert --in-- therefor On page 2, in Column 2, item (56) under "Other Publications", Line 54, delete "XMLover" and insert --XML over-- therefor In the Claims In Column 12, Line 67, in Claim 9, delete "the" and insert --file-- therefor In Column 14, Line 56, in Claim 20, delete "sad" and insert --said-- therefor Signed and Sealed this
Fourth Day of June, 2019

Andrei Iancu
*Director of the United States Patent and Trademark Office*